United States Patent

[11] 3,612,569

| [72] | Inventor | Joseph A. Marinelli<br>14 W. Hazelcroft Ave., New Castle, Pa. 16103 |
|---|---|---|
| [21] | Appl. No. | 794,944 |
| [22] | Filed | Jan. 29, 1969 |
| [45] | Patented | Oct. 12, 1971 |

[54] TRAILER CONSTRUCTION
13 Claims, 13 Drawing Figs.

[52] U.S. Cl. .................................................. 280/106,
280/423, 29/155
[51] Int. Cl. ............................................. B62d 53/06
[50] Field of Search ........................................... 280/106,
106 T, 423

[56] References Cited
UNITED STATES PATENTS

| 2,322,841 | 6/1943 | Foster | 280/106 T |
|---|---|---|---|
| 2,622,895 | 12/1952 | Larsen | 280/106 T |
| 2,743,940 | 5/1956 | Bohlen | 280/106 T |
| 2,812,192 | 11/1957 | Cole | 280/106 T |
| 2,841,415 | 7/1958 | Black | 280/106 T |
| 2,846,235 | 8/1958 | Curell | 280/106 X T |
| 2,915,320 | 12/1959 | Jewell et al. | 280/106 T |
| 2,926,928 | 3/1960 | Bennett | 280/106 T |
| 2,982,580 | 5/1961 | Lewis | 296/28 |
| 3,092,396 | 6/1963 | Thomas | 280/106 T |
| 3,101,272 | 8/1963 | Setzer | 29/446 X |
| 3,300,839 | 1/1967 | Lichti | 29/155 |

FOREIGN PATENTS

| 907,808 | 7/1945 | France | 280/106 T |
|---|---|---|---|

*Primary Examiner*—Leo Friaglia
*Attorneys*—Clarence A. O'Brien and Harvey B. Jacobson ABSTRACT: A trailer construction including a plurality of longitudinally extending transversely spaced main beams each fabricated to include a longitudinal upwardly convex bow. The longitudinal beams are interconnected by means of transverse bracing members extending and secured therebetween and a central longitudinal decking structure is secured over and between the main beams while longitudinal opposite side decking structures are supported in cantilever fashion from and project outwardly of the remote sides of the main beams. Also, the forward end of the trailer includes a fabricated sheet steel fifth wheel plate keyed into and secured to and between the forward ends of the main beams.

Joseph A. Marinelli
INVENTOR

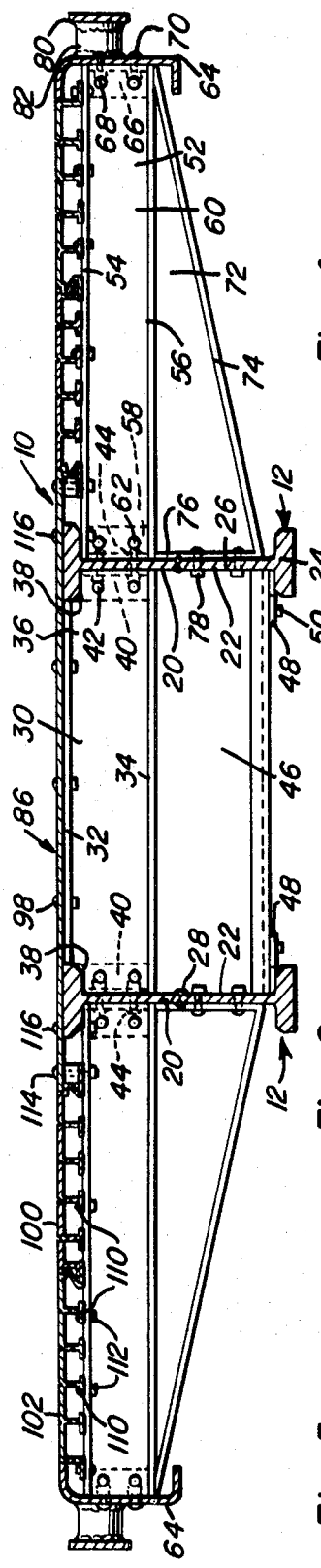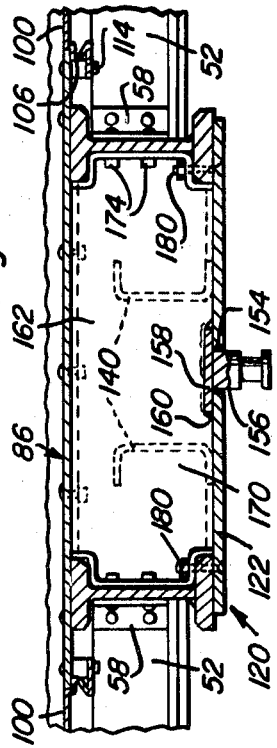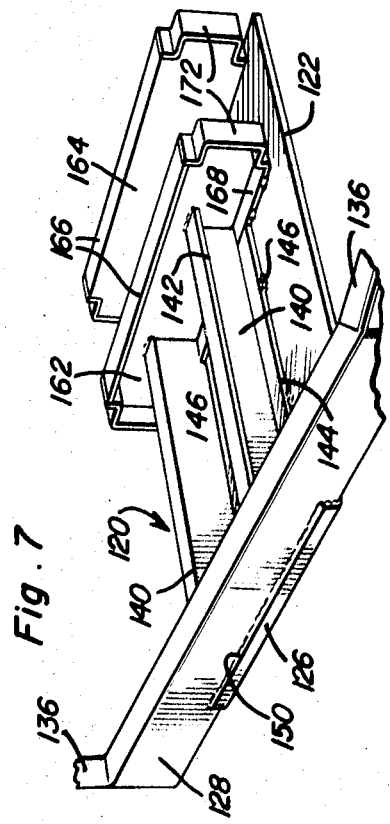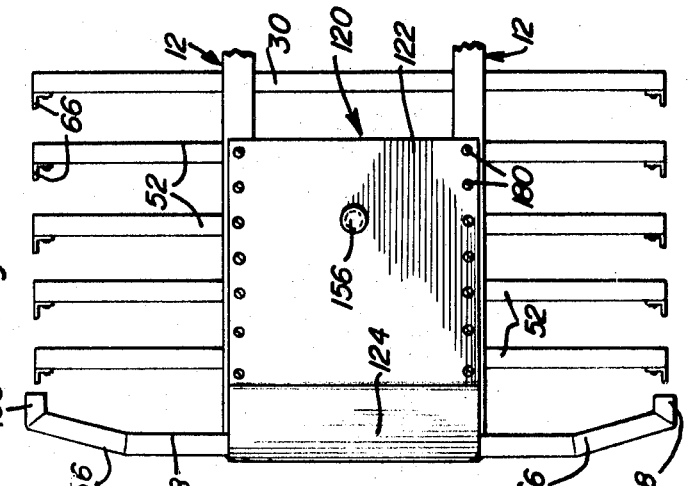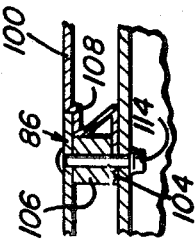
Joseph A. Marinelli
INVENTOR.

PATENTED OCT 12 1971 3,612,569
SHEET 3 OF 4
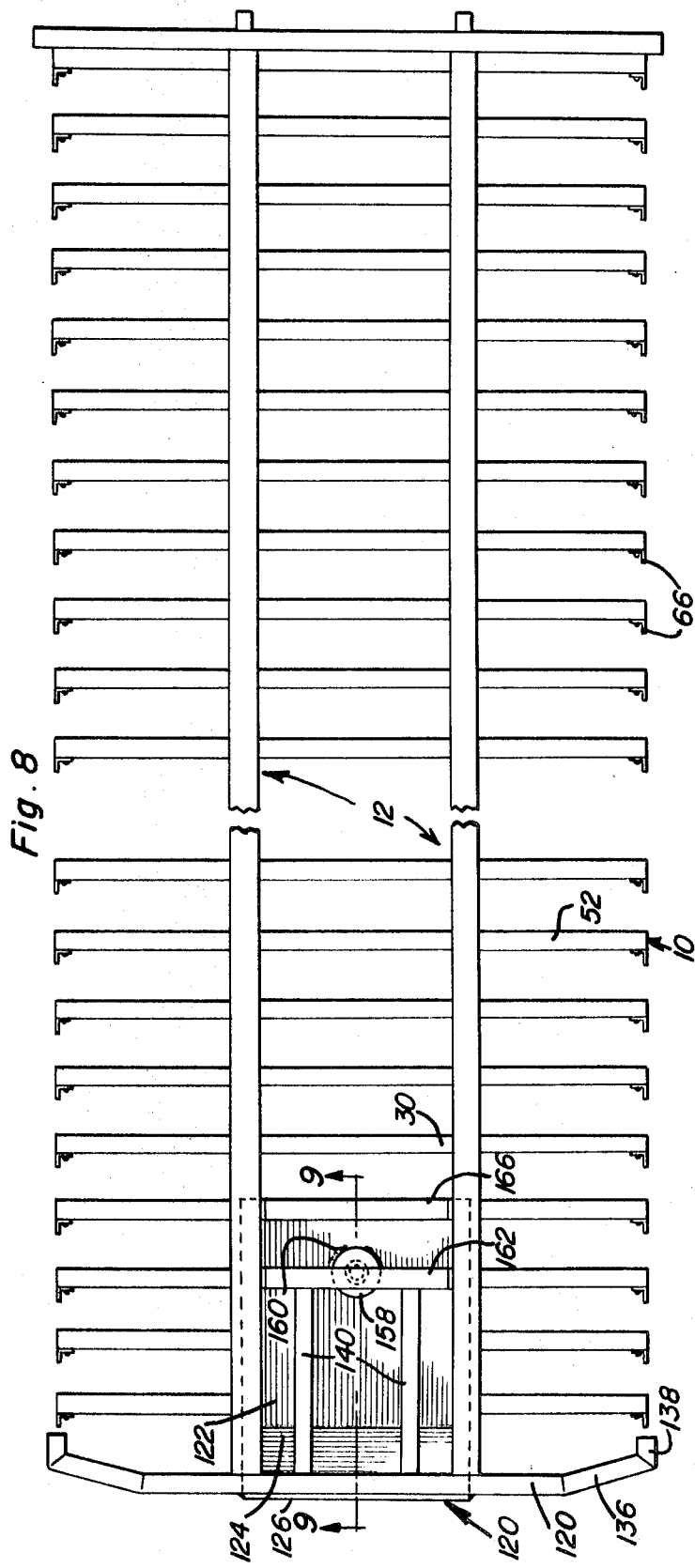
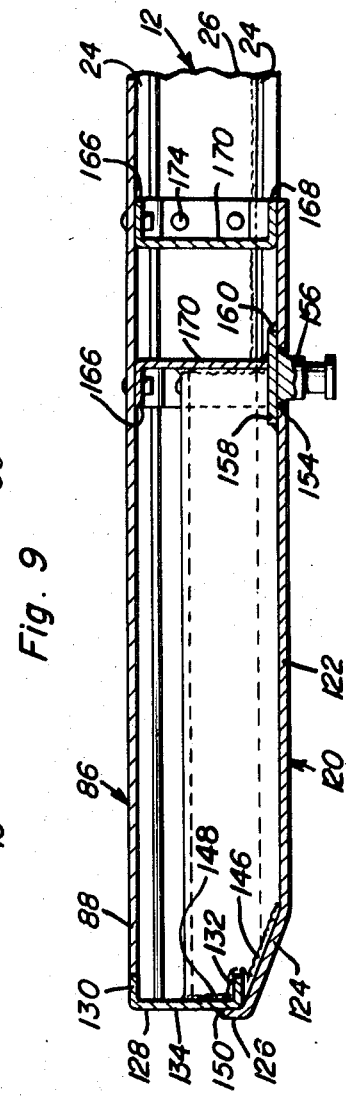
Joseph A. Marinelli
INVENTOR.
BY Lawrence A. O'Brien
and Harvey B. Jacobson
Attorneys

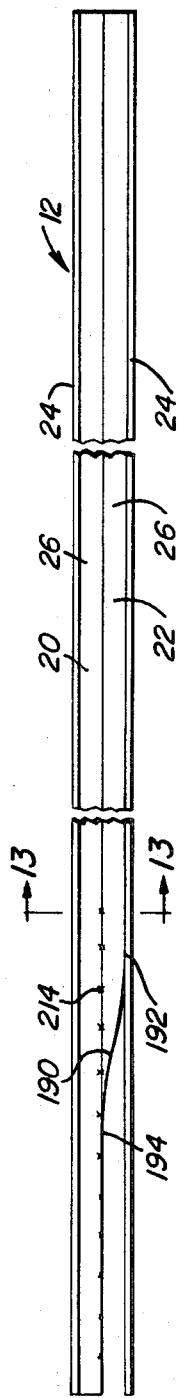
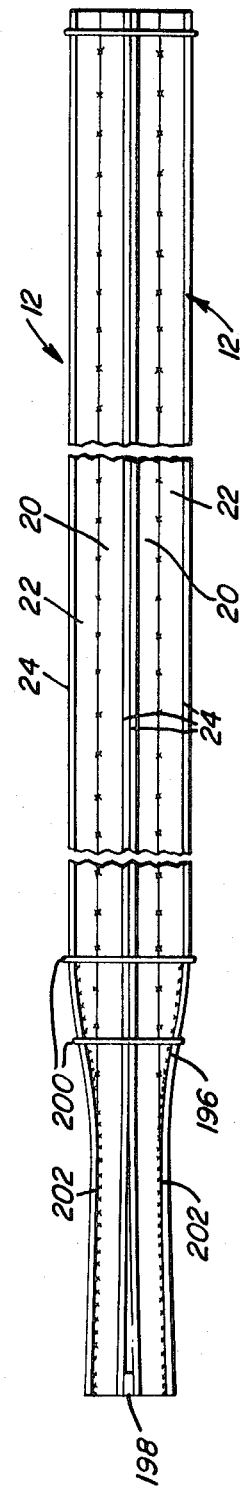
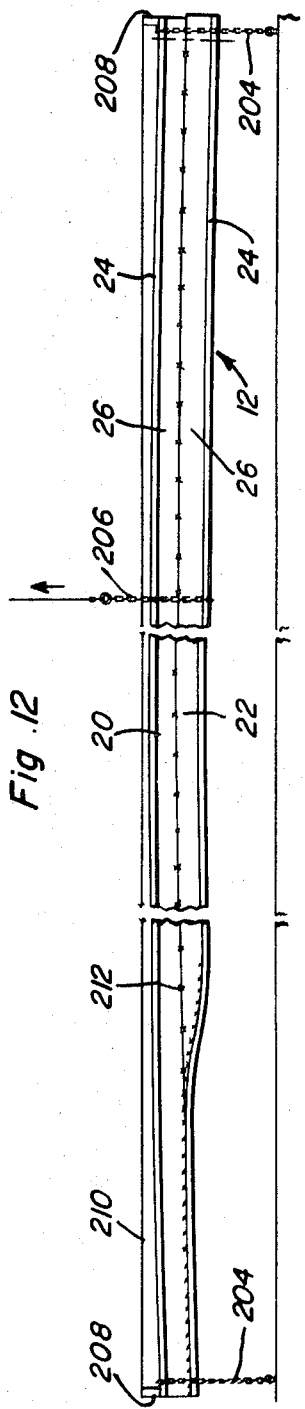
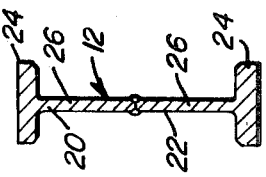

TRAILER CONSTRUCTION

Most lightweight trailers are constructed with steel main frames and aluminum bodies. The utilization of aluminum to form the trailer bodies as opposed to the use of steel sheet in forming trailer bodies constitutes a considerable savings in weight. Further, trailers designed to carry heavy loads have in the past been provided with steel frames inasmuch as these frames will take considerable loads before flexing beyond their elastic limits and incurring a permanent set. While it has been found that trailer frames constructed of aluminum may bend considerably greater amounts before their elastic limits are exceeded, the placement of a heavy load on a trailer constructed with an aluminum frame results in the frame being bowed so as to be swayback in nature and once this swayback condition of an aluminum trailer frame is reached the trailer frame is more susceptible to bending beyond its elastic limit. Further, a swayback aluminum trailer frame supporting a heavy load is subject to additional stresses applied thereto as the trailer moves over road irregularities causing the load supported from the trailer to bounce up and down with the midportion of the trailer upon which a major portion of the load may be centered.

Accordingly, while some trailers are constructed with aluminum frames in an attempt to save weight, most aluminum frame trailers are subject to excessive flexing and ultimate failure if overloaded.

It is therefore the main object of this invention to provide a trailer construction utilizing a novel aluminum frame which will greatly resist flexure and which will be fabricated in a manner so as to be initially bowed in a slightly humpback manner, whereby the frame of the trailer, when loaded to its rated capacity, will retain at least some of its humpback bow and not be subject to excessive further flexure and possible failure due to loads supported thereon having a tendency to bounce as the trailer moves over the road irregularities.

Another important object of this invention is to provide an improved trailer frame construction fabricated out of aluminum and in a manner whereby flexure of the main longitudinal beams of the trailer due to a heavy load being supported therefrom will be greatly reduced in relation to the flexure which would occur if conventional aluminum beams of generally the same configuration were used.

Another very important object of this invention is to provide a trailer construction in accordance with the preceding objects and including a fabricated steel fifth wheel plate and pin assembly constructed in an improved manner and keyed to and between and also secured to the main aluminum beams of the trailer in an improved manner.

Another object of this invention of great importance is to provide a trailer frame in accordance with the preceding objects and including decking structure and support means therefor secured to each other and to the main beams of the trailer in a novel manner whereby to further strengthen and complement the frame structure of the trailer.

Yet another object of this invention is to provide a trailer construction whose frame and deck supporting components are riveted together in an improved manner affording great durability and freedom of maintenance.

Another object of this invention is to provide a trailer construction fabricated in a manner whereby individual components of the trailer construction may be readily replaced, when desired.

Another important object of this invention is to provide a method of fabricating a trailer main frame beam out of aluminum and in a manner whereby the beam is longitudinally bowed so as to be humpback in form.

An additional object of this invention is to provide a method of fabricating a trailer main frame beam in accordance with the immediately preceding object and in a manner whereby the fabricated beam will have increased resistance to flexure.

A final object of this invention to be specifically enumerated herein is to provide a trailer construction in accordance with the preceding objects which will conform to conventional forms of manufacture, be of simple construction and easy to fabricate so as to provide a device that will be economically feasible, long lasting and require a minimum of expensive material processing steps to assemble.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged transverse vertical sectional view taken substantially upon the plane indicated by the section line 3—3 of FIG. 1;

FIG. 4 is an enlarged fragmentary transverse vertical sectional view taken substantially upon the plane indicated by the section line 4—4 of FIG. 1;

FIG. 5 is an enlarged fragmentary transverse vertical view illustrating the manner in which the center and side decking are secured to cantilever braces of the main trailer frame;

FIG. 6 is a fragmentary bottom plan view of the forward portion of the trailer illustrating the manner in which the fifth wheel plate and pin assembly is secured in position relative to the forward ends of the longitudinal beams of the trailer;

FIG. 7 is a perspective view of the fifth wheel plate and pin assembly;

FIG. 8 is a bottom plan view of the trailer frame with parts thereof being broken away including the decking structure of the trailer;

FIG. 9 is an enlarged fragmentary longitudinal vertical sectional view taken substantially upon the plane indicated by the section line 9—9 of FIG. 8;

FIGS. 10–12 are fragmentary side elevational views of the beams utilized in the construction of the trailer frame and illustrating certain steps performed during their fabrication; and FIG. 13 is an enlarged transverse vertical sectional view taken substantially upon the plane indicated by the section line 13—13 of FIG. 10.

Figure 1:
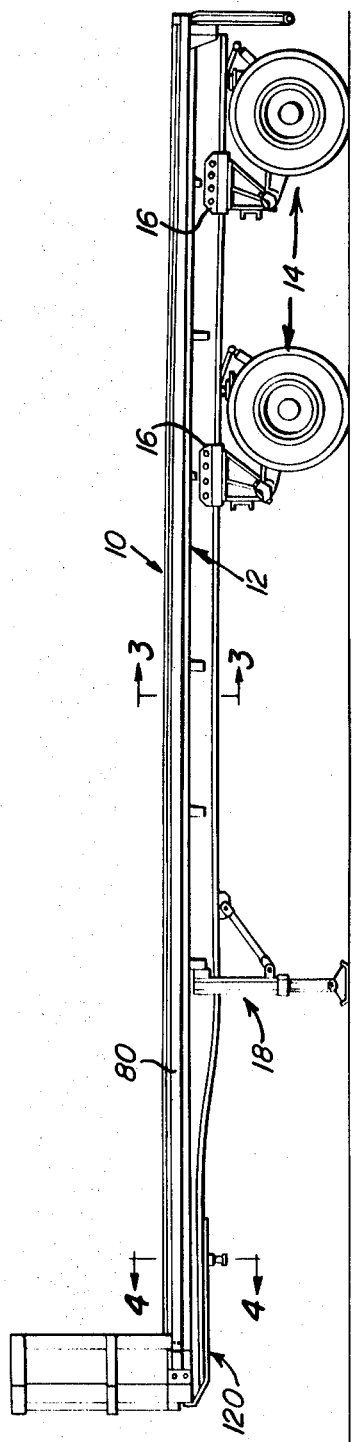
FIG. 1 is a side elevational view of a trailer constructed in accordance with the present invention.

Referring now more specifically to the drawings, the numeral 10 generally designates the improved trailer construction of the instant invention. The trailer 10 actually comprises a semitrailer including a pair of opposite side longitudinally extending main frame beams 12 from which a pair of rear axle assemblies generally referred to by the reference numerals 14 are supported. The axle assemblies 14 are secured to the main frame beams by means of hanger brackets 16 such as that disclosed in my prior U.S. Pat. No. 3,392,998. In addition, the trailer construction 10 includes generally conventional landing gear such as that generally designated by the reference numeral 18.

With reference now more specifically to FIGS. 3 through 9 of the drawings, it may be seen that the main frame beams each comprises a pair of beam elements 20 and 22, see FIG. 3. Each of the beam elements is substantially T-shaped in cross section and includes a horizontal flange portion 24 and a vertical flange or web portion 26. The beam elements 20 are disposed upright and the beam elements 22 are disposed in inverted position with the free longitudinal edge portions of corresponding vertical web portions 26 of each pair of beam elements 20 and 22 welded together as at 28.

The main frame beams 12 are generally parallel to each other and are spaced laterally apart and interconnected by means of a plurality of channel members 30 including upper and lower flanges 32 and 34 interconnected by means of an upstanding web. The channel members 30 extend between the main frame beams 12 and the opposite upper end corners thereof are cut away as at 38 to provide clearance for the upper horizontal flange portions 24 of the beams 12. The flanges 32 and 34 of each channel member 30 project rearwardly along the trailer construction 10 and angle plates 40 are secured to each end of each web 36 by means of rivets 42 and to the corresponding main frame beam vertical web portions 26 by means of rivets 44. In addition, while the channel members 30 are spaced longitudinally of the trailer construction 10 between the main frame beams 12, at various intervals along the trailer construction 10 is a vertically elongated transverse channel member 46 is utilized in lieu of a channel member 30 and the opposite ends of the heavier gauge channel members 46 are welded to the confronting surfaces of the vertical web portions 26 of the main frame beams 12. In addition, a pair of gusset plates are provided at the opposite ends of each channel member 46 and are secured thereto by means of rivets 50.

In addition to the channel members 30 and 46, the trailer construction 10 includes a plurality of longitudinally spaced cantilever braces 52 which project transversely outwardly from the vertical web portions 26 of the upper beam elements 22. The cantilever braces 52 are also channel shaped in configuration and include upper and lower flanges 54 and 56 and the inner ends of the cantilever braces 52 are secured to the vertical web portions 26 of the upper beam elements 20 by means of angle plates 58 similar to angle plates 40 to which the web portions 60 of the cantilever braces 52 are secured by means of rivets 62. The same rivets 44 utilized to secure the angle plates 40 to the upper vertical web portions 26 are also utilized to secure the angle plates 58 to the upper vertical web portions 26.

An outer side channel member 64 is provided and extends along each side of the trailer construction 10 and is supported from the outer ends of the cantilever braces 52 by means of angle plates 66 secured to outer ends of the web portions 60 by means of rivets 68 and to the outer side channel members 64 by means of rivets 70. Here again, the cantilever braces 52 are spaced longitudinally along the trailer construction 20 and are aligned with corresponding channel members 30 extending between the main frame beams 12. Also, certain of the cantilever braces 52 are omitted and cantilever braces 72 which are of greater vertical height at their inner ends are used instead of the omitted cantilever braces 52. The cantilever braces 72 include upper flanges corresponding to flanges 54 and inclined lower flanges 74 corresponding to flanges 56. In addition, the inner ends of the cantilever braces 72 include rearwardly directed flanges 76 which are secured to the vertical web portions 26 of the corresponding main frame beams by means of rivets 78.

Disposed outwardly of and along the outer side channel members 64 are a pair of rub rails 80 which are supported from and outwardly of the channel members 64 by means of cylindrical spacers 82 extending between the channel members 64 and the corresponding rub rails 80.

Figure 2:
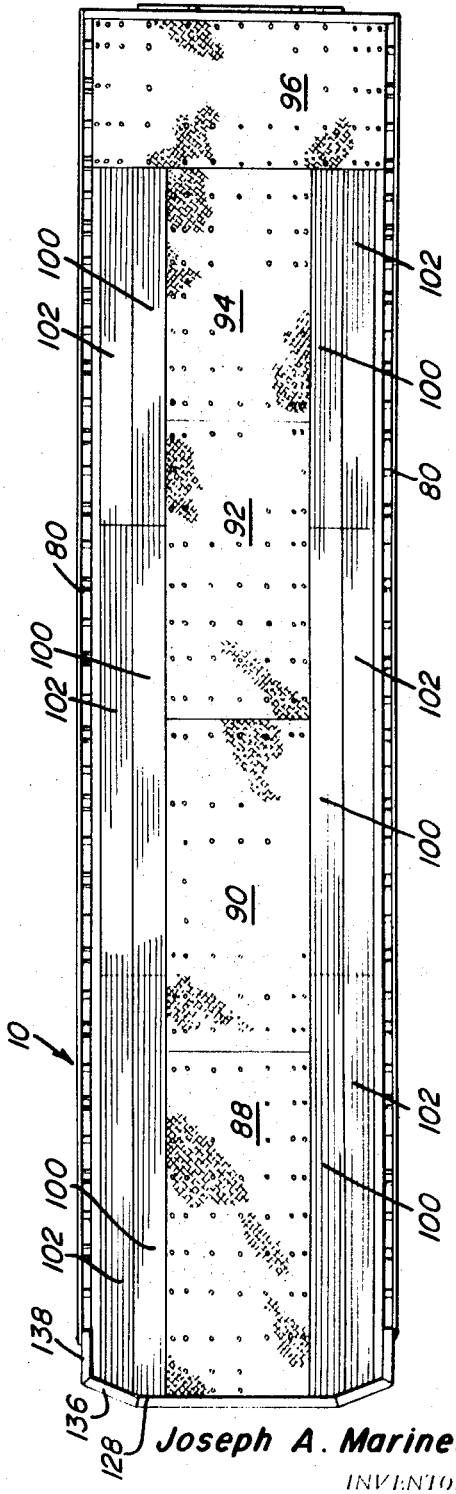
FIG. 2 is a top plan view of the trailer illustrated in FIG. 1.

With attention now invited more specifically to FIGS. 3-5 of the drawings, it may be seen that a central longitudinally extending section of diamond plate generally referred to by the reference numeral 86 is provided. The diamond plate 86 includes a plurality of diamond plate sections 88, 90, 92 and 94, see FIG. 2, extending longitudinally of the central area of the trailer construction 10 as well as rearmost transversely extending section 96 of the diamond plate. The diamond plate sections are secured to the corresponding flanges 32 of the channel members 30 and the corresponding upper flanges of the channel members 46 by means of rivets 98. In addition, the trailer construction 10 includes longitudinally extending pairs of side-by-side inner and outer sections 100 and 102 of extruded aluminum decking extending along the opposite sides of the trailer constructions 10. As can best be seen from FIGS. 3-5 of the drawings, the adjacent longitudinal edge portions of adjacent sections 100 and 102 include portions thereof overlapping each other and the inner longitudinal edge portion of each section 100 includes a lower horizontal flange portion 104 upon whose upper surface an aluminum spacing block 106 rests. In addition, the inner longitudinal edge of each section 100 is notched as at 108 to seatingly receive the adjacent edge portion of the adjacent diamond plate section. Further, with attention now invited more specifically to FIG. 3 of the drawings, it may be seen that each inner and outer section 100 and 102 includes various flange portions 110 which overlie the upper flanges 54 of the corresponding cantilever braces 52 and also the upper flanges of the corresponding cantilever braces 72. Suitable rivets 112 are secured through the flanges 110 and the underlying upper flanges of the cantilever braces 52 and 72 and rivets 114 are secured through the opposite side marginal edge portions of the diamond plate sections, the spacer blocks 106 and the upper horizontal flange portions of the cantilever braces 52 and 72.

Accordingly, it may be seen that the various decking sections are securely fastened and tied into not only the center transverse brace members but also the opposite side cantilever braces. Finally, suitable rivets 116 are secured through the opposite side portions of the diamond plate sections and the upper horizontal flanges of the beam elements 20, see FIG. 3.

With attention invited now more specifically to FIG. 7 of the drawings, there may be seen a fifth wheel plate and pin assembly referred to in general by the reference numeral 120. The assembly 120 includes a heavy gauge bearing plate 122 whose forward end position is inclined upwardly as at 124, see FIG. 9 and terminates forwardly in an upturned flange 126. A front transverse channel member 128 is provided and includes upper and lower horizontal flange portions 130 and 132 interconnected by means of an upstanding web portion 134. The channel member 128 has its opposite end portions angled rearwardly as at 136 and the remote ends of the rearwardly angled end portions 136 terminate in rearwardly directed terminal ends 138, see FIG. 6.

A pair of longitudinal channel members 140 are provided and include upper and lower flange portions 142 and 144 interconnected by means of a vertical web portion 146. The channel members 140 are arranged in transversely spaced relation extending longitudinally of the assembly 120 and the forward lower corners of the channel members 140 are cut away to conform to the contour of the forward marginal edge portion of the bearing plate 122 to which the channel members 140 are secured by welding 146. In addition, the channel member 128 is secured to the forward ends of the channel members 140 by welding 148 and the flange or flanges portion 126 of the bearing plate 122 is secured to the outer surface of the vertical flange or web portion 134 of the channel member 128 by means of welding 150.

From FIG. 4 of the drawings, it may be seen that the width of the bearing plate 122 is such that it will underlap the lower horizontal flange portions 24 of the vertically abbreviated forward end portions of the main frame beams 12. In addition, the rear marginal portion of the bearing plate 122 has an opening 154 formed therethrough and a kingpin element 156 has its upper flange portion 158 welded to the upper surface of the bearing plate 122 as at 160 with the shank portion of the kingpin element 156 projecting downwardly through the opening 154.

The assembly 120 additionally includes a pair of front and rear transverse partitions 162 and 164 which are substantially identical in configuration. Each partition 162 and 164 comprise a channel member including upper and lower flange portions 166 and 168 interconnected by means of a vertical web portion 170. The central portion of the lower marginal edge portion of the partition 162 is cut away to provide clearance for the upper flange plate 158 of the kingpin element 156 and the opposite ends of the partitions 162 and 164 are cut away to conform and be received in the confronting channels defined by the opposing inner sides of the main frame beams 12. The opposite ends of each of the partitions 162 and 164 have contoured strap members 172 welded thereto and suitable rivets 174 are utilized to secure the strap members 172 to the upper vertical web portions 26 of the vertically abbreviated forward end portions of the main frame beams 12. Also, it will be noted that the assembly 120 may have the portions thereof disposed rearward of the center section of the channel member 128 and above the bearing plate 122 telescoped into the area bound between the forward ends of the main frame beams 12 before the assembly 120 is secured in position. From FIG. 9 of the drawings, it may be seen that the forward section 88 of the diamond plate decking 86 has its upper surface flush with the upper surface of the upper horizontal flange 130 of the channel member 128 and that the upper surface of the bearing plate 122 clearly underlies the undersurface portions of the lower horizontal flange portions 24 of the main frame beams 12. In addition, from FIG. 4 and 6 of the drawings it may be seen that suitable bolts 180 are secured through the opposite side longitudinal edge portions of the bearing plate 122 and the inner marginal edge portions of the lower horizontal flange portions 24. In this manner, and with the opposite terminal ends 138 of the channel member 128 tied into the forward ends of the opposite side channel members 64, the assembly 120 is securely fastened to the forward end of the trailer construction between the forward ends of the main frame beams 12. However, if it is desired, the assembly 120 may be readily removed inasmuch as it is only riveted and bolted into final position at the front of the trailer construction 10.

Thus, not only is the decking assembly 86 securely tied into the various cantilever braces 52 and 72 as well as the channel members 30 and 46, but the fifth wheel plate and pin assembly 120 is effectively tied into the forward ends of the main frame beams 12.

With attention now invited more specifically to FIGS. 10–13 of the drawings, attention is again drawn to the fact that each of the main frame beams 12 comprises a pair of upper and lower beam elements 20 and 22.

In fabricating each of the beams 12, the two beams members 20 and 22 of each beam 12 are disposed in side-by-side relation with the free longitudinal edge portions of the vertical web portions 26 thereof in abutting relation and are first clamped together to form one I-beam or main frame beam 12. Then, the beams being generally 40 feet in length, they are tack-welded at 1-foot intervals for a distance of 12 feet from the end that will make up the neck or forward end of the main frame beam 12. Then, the vertical web portion 26 of the lower beam element 22 has its forward section cut therefrom along a reversely curving path 190 from point 192 to point 194. It will be noted that the path 192 curves upwardly from the lower horizontal flange portion and then curves in the reverse direction to merge with the lower marginal edge of the vertical web portion 26 of the upper beam element 22 at 194. Thereafter, the lower horizontal flange portion 24 is bent upwardly as at 196 and butted against the edge of the lower vertical web portion 26 defining the path of 190 and the longitudinal free edge portion of the upper vertical web portion 26.

Each of the main frame beams 12 has the previously mentioned steps of fabrication performed thereon and thereafter the two main frame beams 12 are butted together in inverted relation in the manner illustrated in FIG. 11 of the drawings with a 2-inch spacer block 198 disposed between the front ends of the beams 12. Thereafter, the beams are clamped together by clamps 200 at points spaced along the forward end portions and continuously welded as at 202 to rigidly affix the horizontal lower flange portions 24 to cut the portions of the lower web portions 26 and the lower edge of the upper vertical web portions 26. After the welds 202 have cooled, the clamps 200 are removed three-quarters of an inch of the bow put in each forward vertically reduced prestressed neck portions of the beams 12 will be retained. Thereafter, each main frame beam 12 has its opposite ends anchored down by a suitable anchor such as by chains 204 and the central portion of each beam 12 is connected to a suitable hoist by means of a chain 206. A 5¾ inch block 208 is placed on top of each end of the beam 12 and a taut line 210 is drawn over and secured relative to the blocks 208. Thereafter, the hoist or crane is utilized to pull upward on the central portion of the beam 12 by means of the chain 206 until the central portion of the beam 12 is approximately 2 inches from the central portion of the string or line 210. Thereafter, the confronting edge portions of the vertical web portions 26 disposed rearwardly of the vertically reduced forward neck end portions of the beams 12 are tack-welded together as at 212 and the stress on the beams 12 applied by a chains 204 and 206 is released. Thereafter, the beams 12 retain a 2-inch arc and the rear ends thereof may be cut to the desired length, the entire beams thus being prestressed.

By first tack-welding the forward ends of the vertical web portions 26 of each beam 12 together as at 214 and then bending the vertically reduced forward ends of the beams 12 after the sections of the lower vertical web portions 26 have been removed by using the block 198 and the clamps 200 and the lower horizontal flange portions 24 are bent upwardly before the latter are welded to the lower vertical web portion 26 and the lower longitudinal edge of the forward end portion of the upper vertical web portion 26, the forward end portions of the beams are prestressed so as to insure that the majority of the bow placed in the forward ends of the beams 12 will be retained. Thereafter, when stressing the beams 12 throughout their entire length in the manner illustrated in FIG. 12, prior to the beam elements 20 and 22 being tack-welded together, the beam elements 20 and 22 are individually stressed and thereafter tack-welded together while under stress before the chains 204 and 206 are released. In this manner, the beams 12 are fabricated with a permanent bow so as to withstand considerably greater loads without assuming a swayback condition.

If it is desired, the rear end portions of the beam elements 20 and 22 may be tack-welded together at longitudinally spaced points in the manner illustrated in FIG. 11 of the drawings after the step of FIG. 10 of the drawings has been completed. Then, after the step illustrated in FIG. 11 of the drawings has been completed, the tack-welds throughout all but the forward end portions of the beams 12 are cut prior to the beams being bowed through out their entire length in the manner illustrated in FIGS. 12 of the drawings and the vertical web portions 26 of the beam elements 20 and 22 are thereafter again tack-welded together.

By prestressing the beams 12 with permanent bows therein and by tying the diamond plate 86 to the beams 12 and the inner and outer flooring sections 100 and 102 to the cantilever braces 52 and 72 in the manner hereinbefore set forth, a "-bridge-type" construction is provided which, including the improved manner in which the fifth wheel plate and pin assembly 120 is secured between the forward ends of the main beams 12, completely ties all components of the trailer construction 10 together. In addition, it is to be noted that the components of the trailer construction, exclusive of the running gear and the various deck sections, are secured together prior to the main beams 12 being continuously welded throughout the spot-welded areas thereof illustrated in FIG. 12 of the drawings. After the skeletal frame of the trailer construction 10 exclusive of the running gear and the various flooring sections have been secured together, the trailer 10 is first turned on one side and the upper sides of the beams 12 are continuously welded throughout the spot-welded areas of FIG. 12. Then, the trailer 10 is placed on its other side and the then upper surfaces of the beams 12 are continuously welded throughout the spot-welded areas illustrated in FIG. 12. Thereafter, the decking sections and running gear are supplied to the trailer 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is or follows:

1. A trailer main frame including a plurality of longitudinally extending transversely spaced beams each formed to include a longitudinal upwardly convex bow, a plurality of transverse bracing members extending and rigidly secured to and between said main beams, said main frame including opposite side laterally outwardly projecting horizontal cantilever braces whose inner ends were secured to the corresponding beams, and a pair of longitudinal members extending along and secured to and between corresponding sets of outer ends of said cantilever braces.

2. The combination of claim 1 including center metal decking plates overlying and rigidly secured to the upper portions of said beams and said transverse bracing members.

3. The combination of claim 1 including a pair of opposite side sets of decking sections disposed over and rigidly secured to the upper portions of said cantilever braces.

4. The combination of claim 3 wherein said transverse bracing members comprise channel members including generally horizontal upper and lower flange portions interconnected by means of an upstanding bight portion.

5. The combination of claim 3 said transverse bracing members comprising channel members including generally horizontal upper and lower flange portions interconnected by means of an upstanding bight position, center metal decking plates overlying and rigidly secured to the upper portions of said beams and said horizontal upper flange portions of said transverse bracing members, means securing the opposite side marginal edge portions of said plates to the adjacent edge portions of said decking sections.

6. A fabricated fifth wheel plate and pin assembly comprising a horizontally disposed bearing plate including opposite side longitudinal edge portions, a plurality of elongated transversely spaced and longitudinally extending bracing elements overlying and rigidly secured to said plate with said bracing elements spaced inwardly of the longitudinal edge portions of said plate, and a transverse partition overlying said plate rearward of the rear ends of said bracing elements and rigidly secured to said plate, the rear ends of said bracing elements being secured to said partition, the forward marginal edge portion of said plate being inclined forwardly and upwardly and terminates as its upper marginal edge portion in an integral upstanding flange.

7. A fabricated fifth wheel plate and pin assembly comprising a horizontally disposed bearing plate including opposite side longitudinal edge portions, a plurality of elongated transversely spaced and longitudinally extending bracing elements overlying and rigidly secured to said plate with said bracing elements spaced inwardly of the longitudinal edge portions of said plate, and a transverse partition overlying said plate rearward of the rear ends of said bracing elements and rigidly secured to said plate, the rear ends of said bracing elements being secured to said partition, said partition and said bracing elements being channel shaped in configuration and including upper and lower horizontal flange portions interconnected by integral upstanding web portions.

8. The combination of claim 7 wherein said plate includes an opening formed therethrough, a fifth wheel pin structure including an upstanding pin element provided with an enlarged integral mounting flange near its upper end, said mounting flange being disposed over and secured to the portions of said plate defining said opening with said pin element projecting downwardly through said opening.

9. A trailer construction including a pair of transversely spaced longitudinal extending frame beams generally I-shaped in cross section and each including upper and lower elongated generally horizontal longitudinal flanges interconnected by means of an upstanding flange extending and secured between said upper and lower flanges intermediate their opposite side edges, said trailer construction including a fifth wheel plate and pin assembly supported from one pair of corresponding ends of said beams, said fifth wheel plate and pin assembly including a horizontal plate with opposite longitudinal edge portions spaced apart at least the distance between said lower flanges of said beams, a plurality of horizontally elongated upstanding transverse partitions extending transversely of said plate along zones spaced longitudinally therealong and whose lower marginal edge portions are secured to said plate, the opposite end upstanding marginal edge portions of said partitions being contoured to be and snugly received within the confronting horizontal channels defined by the opposing sides of said beams, means securing the opposite longitudinal edge portions of said plate beneath and to the lower flanges of said beams.

10. The combination of claim 9 wherein said assembly includes a plurality of elongated transversely spaced and longitudinally extending bracing elements disposed forward of the forwardmost partition overlying and rigidly secured to said plate with said bracing elements spaced inwardly of the longitudinal edge portions of said plate, the rear ends of said bracing elements being secured to said forwardmost partition.

11. The combination of claim 10 wherein the forward marginal edge portion of the said plate is inclined forwardly and upwardly and terminates at its upper marginal edge portion in an integral upstanding flange.

12. The combination of claim 11 wherein said partition and said bracing elements are channel shaped in configuration and include upper and lower horizontal flange portions interconnected by integral upstanding web portions.

13. The combination of claim 9 including means anchoring the opposite contoured ends of said partitions to the adjacent sides of corresponding beam upstanding flanges.